July 14, 1964     E. L. BROWN, JR., ETAL     3,140,591
ABSORPTION REFRIGERATION SYSTEMS
Filed Feb. 11, 1963
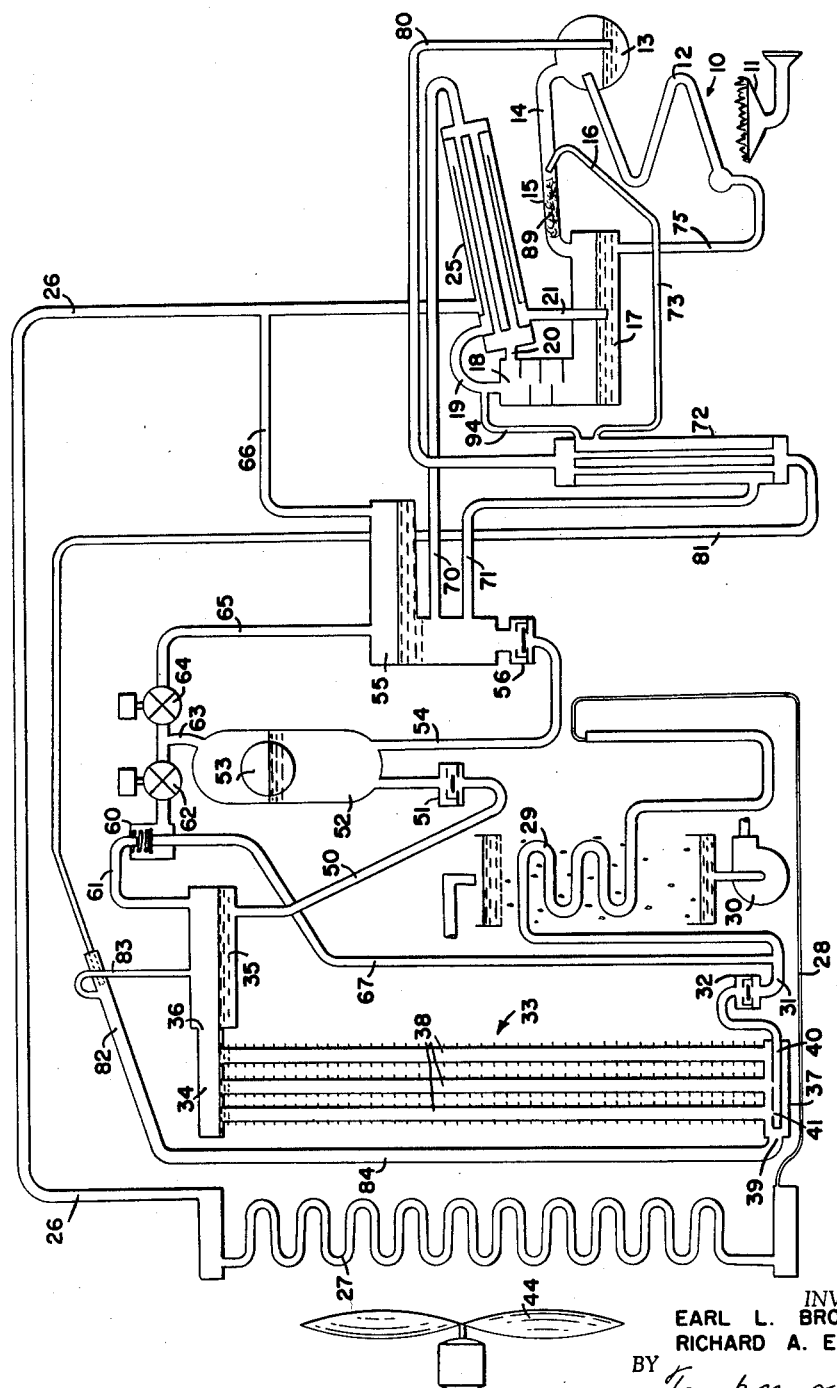
INVENTORS.
EARL L. BROWN, JR.
RICHARD A. ENGLISH.
BY Frank N. Decker Jr.
ATTORNEY.

United States Patent Office 3,140,591
Patented July 14, 1964

---

3,140,591
ABSORPTION REFRIGERATION SYSTEMS
Earl L. Brown, Jr., and Richard A. English, Indianapolis, Ind., assignors to Carrier Corporation, Syracuse, N.Y., a corporation of Delaware
Filed Feb. 11, 1963, Ser. No. 257,585
4 Claims. (Cl. 62—495)

This invention relates to absorption refrigeration systems, and, more particularly, to a method and apparatus for improving the thermodynamic efficiency of an absorption refrigeration cycle.

In an absorption refrigeration system, there is provided an evaporator section having a quantity of refrigerant therein which provides the desired cooling by vaporization of a refrigerant, and an absorber having a quantity of relatively strong or concentrated absorbent solution which serves to absorb vaporized refrigerant from the evaporator section. The strong absorbent solution is thereby diluted with refrigerant and, in order to make the cooling process continuous, it is necessary to separate the refrigerant and absorbent solution. This separation takes place in a generator section to which the diluted or weak absorbent solution is forwarded, and in which the solution is heated to drive off the refrigerant. The vaporized refrigerant is then condensed and returned to the evaporator section, and the reconcentrated or strong absorbent solution is returned to the absorber section.

In order to improve the thermodynamic efficiency of such a system, it is customary practice to utilize a solution heat exchanger to transfer heat between the cool, weak absorbent solution as it is forwarded to the generator for heating, and the warm, strong absorbent solution as it is being returned to the absorber section, where it is desirable that the strong solution be relatively cool. Further increase in efficiency is often obtained by passing refrigerant vapor from the generator section through an analyzer and rectifier section prior to being condensed. The analyzer and rectifier section serve to strip some vaporized absorbent which is present in the refrigerant vapor which comes from the generator section and also serves to precool the refrigerant vapor prior to its entry into the condenser section. The analyzing and rectifying function is customarily achieved by passing some relatively cool solution through a heat exchanger in the rectifier to condense residual absorbent vapor, and then passing the cool solution into direct surface contact in counterflow relation to the mixed vapor as it flows through the analyzer to provide a mass and heat transfer which strips absorbent vapor from the mixed vapors prior to their entry into the rectifier. An example of this type of system, over which this invention is an improvement, is described in Patent No. 3,038,320, granted June 12, 1962.

In accordance with this invention, it has been found that a still further and unexpected improvement in thermodynamic efficiency may be achieved by providing a preanalyzer section wherein weak solution, having been warmed to saturation conditions in the solution heat exchanger, is passed into direct and intimate contact with vapor leaving the generator section prior to its entry into the analyzer and rectifier section. While the weak absorbent solution is relatively warm as it leaves the solution heat exchanger, it is nevertheless cooler than the vapor leaving the generator and, consequently, it is capable of precooling the hot vapor leaving the generator. In addition, the warmed weak solution has a relatively high refrigerant vapor pressure relative to the hot vapor leaving the generator section. By bringing the warmed weak solution into contact with the vapor leaving the generator, a mass and heat transfer effect takes place whereby some of the undesired absorbent vapor is stripped by being condensed from the hot vapor supplied to the preanalyzer, and some of the refrigerant liquid in the weak solution is vaporized into the stream of vapor passing through the preanalyzer section. It will be appreciated that this effect is highly desirable since it reduces the amount of work which must be done in the geneartor by preconcentrating and preheating some of the weak solution, and reduces the amount of work which need be done in the condenser by precooling some of the refrigerant vapor. At the same time, the refrigerant vapor, which it is desired to purify, leaves the preanalyzer with a higher refrigerant concentration.

Accordingly, it is the principal object of this invention to provide a method and apparatus for increasing the thermodynamic efficiency of an absorption refrigeration system.

It is a further object of this invention to provide a preanalyzer section in an absorption refrigeration system for purifying refrigerant vapor and increasing the concentration of the absorbent solution.

These and other objects of this invention will become more readily apparent by reference to the following detailed description and attached drawing wherein the drawing is a schematic cross-sectional view through an absorption refrigeration system embodying the present invention.

Referring particularly to the drawing, there is provided a generator section 10 having a heat source 11, such as a gas fired burner. Absorbent solution having refrigerant absorbed or dissolved therein is supplied to the generator section and flows through generator tubes 12, which are heated by burner 11. Heating of the solution causes the refrigerant to be vaporized or boiled out of the absorbent solution. The resulting mixture of vaporized refrigerant and hot absorbent solution is passed into separation chamber 13.

A suitable absorbent for a refrigeration system of the type herein described is water, and a suitable refrigerant is ammonia. As used in this description, the absorbent solution which is collected in separation chamber 13 may be thought of as being a relatively strong solution because the solution is strong in absorbing power. Conversely, the absorbent solution passed to the generator may be thought of as being a relatively weak solution because it has a substantial quantity of refrigerant absorbed therein and the solution is therefore weak in absorbing power.

Since the absorbent, which may be water, and the refrigerant, which may be ammonia, are both volatile, some absorbent vapor is carried into vapor passage 14 along with the refrigerant vapor which has been distilled from the weak absorbent solution passed into the generator section. This mixture of absorbent and refrigerant vapor passes through a preanalyzer section or passage 15, which will subsequently be described in greater detail. The mixture of vapor flows concurrently with weak solution passed into the preanalyzer section from a weak solution line 16. The resulting gas and liquid contact in the preanalyzer section gives rise to a mass and heat transfer effect by which some of the absorbent vapor, which is relatively less volatile than the refrigerant vapor and therefore is more easily condensed, is condensed, thereby purifying the refrigerant vapor.

The refrigerant vapor is then passed along with the condensed absorbent solution into generator reservoir 17, which contains a quantity of absorbent solution in the bottom thereof. The refrigerant vapor passes over the top of the absorbent solution in generator reservoir 17 and up through analyzer section 18. Weak solution passes from a weak solution passage 20 over a series of plates or other suitable analyzer packing material in contact with the refrigerant vapor. A mass and heat transfer again takes place in analyzer section 18 to further purify the refrigerant vapor by condensing the relatively less volatile absorbent vapor.

The purified refrigerant vapor is then passed from the analyzer section through vapor passage 19 into rectifier section 25. Rectifier section 25 comprises a heat exchanger wherein relatively cool weak solution is passed through the heat exchanger and out weak solution passage 20 in heat exchange relation with the refrigerant vapor. The cool weak solution therefore condenses further absorbent vapor from the refrigerant vapor and the condensed absorbent solution is passed through a drain passage 21 in the heat exchanger to generator reservoir 17.

The thus highly purified refrigerant vapor is then passed through vapor passage 26 into condenser section 27 of the absorption refrigeration system. Air or other suitable ambient cooling fluid is passed over the exterior of the heat exchange tubes which form condenser section 27 to cool and condense the refrigerant vapor passed thereto.

The condensed refrigerant liquid passes through a restriction device 28, such as a capillary tube, and into the coil of a chiller section 29. Water or other heat exchange fluid to be cooled is passed over the exterior of the coil in chiller section 29 and heat is extracted from the heater exchange fluid which is then passed by pump 30 to a suitable location to provide the desired refrigeration effect in the region to be refrigerated or air conditioned. The heat extracted from the heat exchange fluid is absorbed by the refrigerant liquid causing the refrigerant to again vaporize in the coil of chiller section 29.

The vaporized refrigerant is then passed through passage 31 having a check valve 32 therein to absorber section 33. Absorber section 33 comprises an upper header 34 having an outlet passage 36 for discharging weak absorbent solution into inlet tank 35. Absorber section 33 is also provided with a lower header 47 and a plurality of absorber tubes or passages, generally designated 38, having open ends communicating with the upper and lower headers. Absorber tubes 38 permit the flow of absorbent solution between upper and lower headers 34 and 37.

Preferably, absorber tubes 38 are spaced from one another and provided with suitable fins so that air or other ambient cooling fluid may be passed over the absorber tubes to cool the absorbent solution therein. It will be appreciated that a single fan 44 may be used to pass air over absorber tubes 38 and the heat exchange coil or tubes in condenser section 27, if desired.

A refrigerant vapor inlet distributor 40 is provided in lower header 37 and is connected to refrigerant vapor line 31, as shown in the drawing, to admit refrigerant vapor into the open ends of certain predetermined absorber tubes 38 through orifices 41 in the distributor.

In operation, the absorber tubes 38 having associated adjacent inlet orifices have a mixture of refrigerant vapor and absorbent solution flowing through them from lower header 37 toward upper header 34. As the mixture of vapor and solution rises upwardly in absorber tubes 38, the refrigerant vapor is absorbed into the absorbent solution so that very little, if any, refrigerant vapor reaches upper header 34. At the same time, the absorber tubes 38 which do not have adjacent refrigerant vapor orifices are permitted to carry absorbent solution downwardly from upper header 34 to lower header 37 in a controlled recirculation pattern throughout the absorber. By controlling and optimizing the pattern of recirculation within the absorber, it is assured that all of the absorber tubes into which vapor is injected function to efficiently absorb vapor.

The weak absorbent solution having dissolved therein considerable refrigerant vapor is passed through outlet 36 of absorber section 33 into inlet tank 35, as previously explained. From inlet tank 35, the weak solution flows through passage 50, solution check valve 51 into solution trap 52. Solution trap 52 may have a float 53 therein for actuating associated valves. Weak solution flows from solution trap 52 through outlet passage 54 and check valve 56 into outlet tank 55.

From outlet tank 55, the weak solution is divided into two portions. The first portion of the weak solution flows through passage 70 through the interior of rectifier 25, passage 20 and analyzer 18 into generator reservoir 17, thereby condensing absorbent vapor in the rectifier and analyzer as previously desecribed.

The other portion of the weak solution is passed from outlet tank 55 through passage 71 into heat exchanger 72 where it is warmed. After passing through the heat exchanger, the warmed weak solution passes through passage 73 into preanalyzer section 15, where it is additionally warmed and concentrated by condensing some absorbent vapor from the vapor passing through the preanalyzer section from generator section 10 to generator reservoir 17. The weak solution is heated sufficiently in the heat exchanger so as to reach saturation conditions and any flashed refrigerant vapor passes to the rectifier section through line 94.

In accordance with this invention, solution passage 16 is connected to vapor passage 14 leading from generator section 10 to generator reservoir 17. Weak solution from absorber section 33 flows through inlet tank 35, passage 50, trap 52, passage 54, outlet tank 55, and passage 71 to heat exchanger section 72 where the weak solution is warmed to saturation conditions by heat exchange with strong solution flowing through the heat exchanger from generator section 13 through strong solution passage 80. From heat exchangers 72, the warmed weak solution passes through passage 73 into passage 16 and vapor passage 14. The warmed weak solution passes through preanalyzer section 15 into generator reservoir 17 from which it passes through solution passage 75 to generator tubes 12.

In preanalyzer section 15 the warmed weak solution flows concurrently through the preanalyzer with vapor formed in generator section 10. It will be appreciated that a vapor passage 14 leading from the generator section to the analyzer and preanalyzer section is required in any system of the type herein described. However, it has been unexpectedly found that the thermodynamic efficiency of the absorption refrigeration system may be markedly improved by also utilizing this vapor passage as a preanalyzer section in accordance with this invention.

It will be apparent, therefore, that the illustrated embodiment of this invention utilizes a previously existing vapor passage in a novel manner to perform the dual function of passing vapor from the generator to the analyzer and rectifier section, and for the additional function of providing a preanalyzer section to increase refrigeration cycle efficiency without adding additional components to the refrigeration system.

Preanalyzer section 15 serves to provide a mass and heat transfer effect between warmed, saturated, weak solution from heat exchanger section 72 and hot vapor generated in generator section 10 to cool the vapor and to strip vaporized absorbent solution from the vapor thereby purifying and enriching the concentration of refrigerant in the vapor, prior to its entrance into the analyzer and rectifier section. As used in this application, reservoir 17, analyzer 18, and rectifier 25 may be considered as a combined analyzer and rectifier section similar to previously known refrigeration system components.

Preanalyzer section 15 may preferably comprise a slightly downwardly tilted, relatively small diameter tube comprising the vapor passage extending from generator section 10 to the analyzer and rectifier section. Because of the relatively small diameter of this tube, which may be on the order of about 1¼ inches, considerable turbulence and a very intimate and direct contact is achieved between the vapor and the absorbent solution supplied thereto. If desired, preanalyzer section 15 may be made somewhat larger in diameter and filled with a fibrous packing 89 or other extended surface material, such as ceramic rings, or may include a number of baffles to provide an extended surface area for the mass and heat transfer effect to take place.

It will be appreciated that it is desirable to provide a path for vapor and solution in the preanalyzer section such that turbulence and intimate mixing are achieved in order that there be a maximum area of solution in contact with the vapor in the preanalyzer section. For this reason, it is preferred to use a relatively small diameter passage through the preanalyzer section to promote turbulence and mixing therein and to avoid the necessity of using a packing material in the preanalyzer. It will be seen that vapor and solution are to some extent in contact with each other in generator reservoir 17. However, because of the physical size and shape of the generator reservoir, and because of the tendency of solution therein to stratify, only a relatively negligible amount of preanalyzing can take place therein, although by suitable design a preanalyzer section can be incorporated into the generator reservoir. For example, warmed weak solution could be sprayed into the vapor stream in the reservoir. It is also feasible to incorporate the preanalyzer section directly ahead of analyzer 18 by suitable design modification, in which case generator reservoir 17 need not be considered as a part of the analyzer and rectifier section. As used herein, the term "analyzer and rectifier section" is intended to encompass these envisioned modifications.

It has been found that the use of warmed weak solution from the heat exchanger in a preanalyzer section is effective and highly desirable for purification of the refrigerant vapor emanating from the generator section. Even though this solution is at a relatively high temperature, which would suggest the use of cooler solution for the analyzing function as has been prior art practice, the overall efficiency of the refrigeration cycle is improved. This unobvious result comes about for three reasons.

First, considering the efficiency of the entire refrigeration cycle, it is desirable to provide a heat exchanger section and to pass as large a quantity of weak solution through the heat exchanger section as possible to preheat a maximum quantity of weak solution prior to its entry into the generator section.

Second, even though the weak solution has been heated in the heat exchanger, it is still at a sufficiently lower temperature than the vapor emanating from the generator section to be effective in condensing or stripping the relatively less volatile absorbent vapor from the vapor stream passing through the preanalyzer.

Third, the partial pressure of the refrigerant in the vapor emanating from the generator is less than the equilibrium vapor pressure of the refrigerant in the warmed weak solution, while the partial pressure of the absorbent in the vapor is greater than its equilibrium pressure in the warmed weak solution. Consequently, there is an exchange of mass when the two fluids are brought into contact, wherein absorbent vapor condenses into the weak solution and refrigerant vaporizes from the weak solution. This causes the vapor to become richer in refrigerant, while the weak solution becomes stronger or more concentrated in absorbent. There is also an exchange of heat causing the vapor to emerge cooler and the weak solution to become warmer. For example, it has been found that a suitable concentration of weak solution leaving the heat exchanger is 30% ammonia and 70% water, at the saturation temperature of 271° F. Under these conditions, the partial pressure of ammonia in the weak solution is 250 p.s.i.a. The partial pressure of ammonia in the vapor leaving the generator is 214 p.s.i.a. at 310° F. The system pressure is 290 p.s.i.a. Thus, the necessary conditions for mass and heat transfer to take place are present. Thus, an equilibrium is achieved between the warm weak solution and the hot vapor from the generator which increases the thermodynamic efficiency of the refrigeration system.

Warm weak solution from the heat exchanger is preferably used to achieve the preanalyzing effect because it has been heated to saturation conditions in the heat exchanger so that it does not absorb refrigerant vapor in the preanalyzer. Therefore, the action of the preanalyzer and the analyzer and rectifier sections is highly effective in purifying the refrigerant vapor and minimizing the carryover of absorbent into the absorber section where it would adversely affect the performance of the refrigeration system.

The operation of solution trap 52 is more completely described in Patent No. 3,038,320, granted June 12, 1962. Briefly, a low pressure valve 62 serves to vent trap 52 through passage 63, blow-down valve 60, and pressure equalizer line 61 to the inlet tank when valve 62 is open. Under these circumstances, high pressure valve 64 in pressure equalizer line 65 leading from outlet tank 55 is closed. When weak solution has drained into trap 52 from tank 35 so that float valve 53 reaches the upper portion of the trap, low pressure valve 62 is closed and high pressure valve 64 is opened by float 53, thereby pressurizing the trap chamber with high side refrigerant vapor from outlet tank 55 which is pressurized through refrigerant vapor line 66. This causes trap 52 to drain weak solution through line 54 into outlet tank 55.

After trap 52 has drained, suitable control mechanism automatically opens low pressure valve 62 and closes high pressure valve 64 to repeat the solution transfer cycle. Initially upon opening of low pressure valve 62 residual pressure acting on the underside of the diaphragm of blow-down valve 60 opens the blow-down valve so as to vent the pressure in the trap through line 67 to vapor distributor 40 in the bottom of absorber section 33.

The passage of the refrigerant vapor formed in generator section 10 has been now described. The strong solution which also results from the distillation of refrigerant vapor from the weak solution in the generator is collected in separator 13 and passes through passage 80 through the interior of heat exchanger 72, where the hot strong solution is cooled by heat exchange with the relatively cool weak solution passing through line 71, as previously explained. From heat exchanger 72, the strong solution passes through line 81 into the subcooled absorber section 82 and passage 84 to inlet 39 in lower header 37 of absorber section 33. A vent line 83 is provided between vapor space at the top of inlet tank 35 and subcooled absorber section 82 to induce unabsorbed refrigerant vapor in the top of the inlet tank into the cooled strong solution for better cycle efficiency, as more completely described in Patent No. 3,038,316, granted June 12, 1962.

It will be seen that by the practice of this invention there is provided a method and apparatus by which the overall thermodynamic efficiency of an absorption refrigeration system of the type described may be improved through the use of a preanalyzer section of the type described for purifying of vapor from the generator prior to its entrance into the analyzer and rectifier section.

It will be appreciated that the foregoing description is illustrative of a preferred embodiment of this invention, and that the invention may be otherwise embodied within the scope of the following claims.

We claim:
1. An absorption refrigeration system comprising:
   an absorber section,
   a generator section for vaporizing refrigerant,
   a heat exchanger section,
   an analyzer and rectifier section,
   passage means for passing a portion of weak absorbent solution from said absorber section to said analyzer and rectifier section to purify refrigerant vapor passed thereto,
   passage means for passing strong absorbent solution from said generator section to said heat exchanger section, passage means for passing another portion of weak absorbent solution to said heat exchanger section for heat exchange with the strong solution passed thereto, and a preanalyzer section comprising: preanalyzer passage means for passing vapor formed in said generator section to said analyzer and rectifier solution and passage means for passing weak absorbent solution from said heat exchanger section concurrently through said preanalyzer passage means in direct contact with said vapor passing therethrough, prior to mixture of said weak absorbent solution heated in said heat exchanger section with the portion of weak absorbent solution passed through said analyzer and rectifier section and also prior to the entrance of said vapor into said analyzer and rectifier section.

2. An absorption refrigeration system as defined in claim 1 wherein said preanalyzer passage includes a quantity of packing material therein providing an extended surface for mass and heat transfer to take place between said vapor and said absorbent solution.

3. In an absorption refrigeration system:
an absorber section,
a generator section for partially separating refrigerant vapor from absorbent solution by vaporization of said refrigerant,
an analyzer and rectifier section,
vapor passage means for forwarding vapor formed in said generator section to said analyzer and rectifier section,
passage means for forwarding a portion of weak absorbent solution from said absorber section to said analyzer and rectifier section for separating absorbent vapor from refrigerant vapor to purify said refrigerant vapor in said analyzer and rectifier section,
a heat exchanger section,
passage means for forwarding strong absorbent solution from said generator section to said heat exchanger section, and
passage means for forwarding another portion of weak absorbent solution from said absorber section through said heat exchanger section to said generator section in direct contact in said vapor passage means with refrigerant vapor being passed from said generator section to said analyzer and rectifier section, to effect a mass and heat transfer between the weak absorbent solution heated in said heat exchanger and the vapor from said generator section prior to mixture of said weak absorbent solution heated in said heat exchanger section with the portion of weak absorbent solution passed through said analyzer and rectifier section, thereby increasing the concentration of refrigerant in said vapor prior to its entrance into said analyzer and rectifier section.

4. In an absorption refrigeration system comprising:
an absorber section,
a generator section for vaporizing refrigerant,
a heat exchanger section,
an analyzer and rectifier section,
passage means for passing vapor formed in said generator section to said analyzer and rectifier section,
passage means for passing a portion of weak absorbent solution from said absorber section to said analyzer and rectifier section to purify refrigerant vapor passed thereto,
passage means for passing strong absorbent solution from said generator section to said heat exchanger section, and
passage means for passing another portion of weak absorbent solution through said heat exchanger section for heat exchange with the strong solution passed thereto, and to said generator section, the improvement comprising: a preanalyzer section for effecting a mass and heat transfer between warmed weak absorbent solution passing to said generator section from said heat exchanger section, prior to mixture with the portion of weak solution passed through said analyzer and rectifier section, and vapor passing from said generator section to said analyzer and rectifier section, so as to increase the concentration of refrigerant in said vapor prior to its entrance into said analyzer and rectifier section.

References Cited in the file of this patent

UNITED STATES PATENTS

| | | |
|---|---|---|
| 1,830,863 | Watts | Nov. 10, 1931 |
| 1,865,813 | Babcock | July 5, 1932 |
| 1,922,713 | Randel | Aug. 15, 1933 |
| 2,392,894 | Zwickl | Jan. 15, 1946 |
| 3,037,361 | Merrick | June 5, 1962 |
| 3,038,316 | Bourne | June 12, 1962 |